United States Patent [19]

Adam et al.

[11] Patent Number: 5,650,497
[45] Date of Patent: Jul. 22, 1997

[54] AZO DYES, PROCESSES FOR THEIR PREPARATION AND THEIR USE

[75] Inventors: Jean-Marie Adam, Rosenau, France; Peter Sutter, Muttenz, Switzerland

[73] Assignee: Ciba-Geigy Corporation, Tarrytown, N.Y.

[21] Appl. No.: 679,841

[22] Filed: Jul. 15, 1996

[30] Foreign Application Priority Data

Jul. 21, 1995 [CH] Switzerland .................. 2158195

[51] Int. Cl.⁶ .................. C09B 31/047; D06P 1/39; D06P 3/24
[52] U.S. Cl. .................. 534/829; 8/681; 8/924
[58] Field of Search .................. 534/829; 8/924

[56] References Cited

U.S. PATENT DOCUMENTS

| | | | |
|---|---|---|---|
| 3,594,363 | 7/1971 | Stingl | 534/831 |
| 4,384,870 | 5/1983 | Benguerel | 8/540 |
| 4,539,009 | 9/1985 | Nickel et al. | 8/924 X |
| 4,749,784 | 6/1988 | Feeman et al. | 534/728 |
| 5,092,905 | 3/1992 | Doré | 8/924 X |
| 5,094,665 | 3/1992 | Mausezahl | 8/924 X |
| 5,420,258 | 5/1995 | Schaetzer et al. | 534/829 X |
| 5,527,889 | 6/1996 | Schaetzer et al. | 534/829 |

FOREIGN PATENT DOCUMENTS 2058815  4/1981  United Kingdom.

*Primary Examiner*—Fiona T. Powers
*Attorney, Agent, or Firm*—Kevin T. Mansfield

[57] ABSTRACT

Azo dyes of the formula

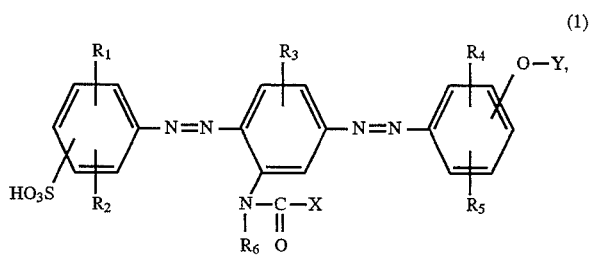

in which $R_1$, $R_2$, $R_3$, $R_4$ and $R_5$ independently of one another are hydrogen, $C_1$–$C_4$alkyl, $C_1$–$C_4$alkoxy or halogen, $R_6$ is hydrogen or $C_1$–$C_4$Alkyl, X is —$C_1$–$C_4$alkylene-O—$C_1$–$C_4$alkyl and Y is hydrogen; unsubstituted or hydroxy- or $C_1$–$C_4$alkoxy-substituted $C_1$–$C_8$alkyl, $C_2$–$C_4$-alkonoyl or $C_1$–$C_4$alkoxycarbonyl; a radical of the formula —$CH_2$—$CH$=$CH_2$;

$C_1$–$C_4$alkylsulfonyl; or unsubstituted or $C_1$–$C_4$alkyl-, $C_1$–$C_4$alkoxy- or halogen-substituted phenylsulfonyl, produce dyeings with good fastness properties on fibre materials containing nitrogen or containing hydroxyl groups.

14 Claims, No Drawings

AZO DYES, PROCESSES FOR THEIR PREPARATION AND THEIR USE

The present invention relates to novel azo dyes, processes for their preparation and the use of these dyes for dyeing and printing fibre materials, in particular textile fibre materials.

The present invention relates to azo dyes of the formula

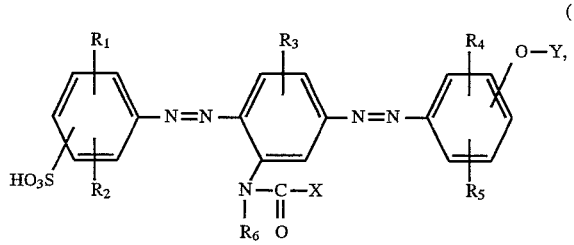

(1)

in which

R$_1$, R$_2$, R$_3$, R$_4$ and R$_5$ independently of one another are hydrogen, C$_1$–C$_4$alkyl, C$_1$–C$_4$alkoxy or halogen, R$_6$ is hydrogen or C$_1$–C$_4$alkyl, X is —C$_1$–C$_4$alkylene-O—C$_1$–C$_4$alkyl and Y is hydrogen; unsubstituted or hydroxy- or C$_1$–C$_4$alkoxy-substituted C$_1$–C$_8$alkyl, C$_2$–C$_4$-alkanoyl or C$_1$–C$_4$alkoxycarbonyl; a radical of the formula —CH$_2$—CH=CH$_2$; C$_1$–C$_4$alkylsulfonyl; or unsubstituted or C$_1$–C$_4$alkyl-, C$_1$–C$_4$alkoxy- or halogen-substituted phenylsulfonyl.

C$_1$–C$_4$alkyl R$_1$, R$_2$, R$_3$, R$_4$, R$_5$ and R$_6$ independently of one another are, for example, methyl, ethyl, propyl, isopropyl, butyl, sec-butyl, tert-butyl or isobutyl, in particular methyl.

C$_1$–C$_4$alkoxy R$_1$, R$_2$, R$_3$, R$_4$ and R$_5$ independently of one another are, for example, methoxy, ethoxy, propoxy, isopropoxy, butoxy or isobutoxy, in particular ethoxy or, preferably, methoxy.

Halogen R$_1$, R$_2$, R$_3$, R$_4$ and R$_5$ independently of one another are, for example, fluorine, bromine or, in particular, chlorine.

The C$_1$–C$_8$alkyl radical Y can be straight-chain or branched. Examples are methyl, ethyl, propyl, isopropyl, butyl, sec-butyl, tert-butyl, isobutyl and straight-chain or branched pentyl, hexyl, heptyl or octyl. The C$_1$–C$_4$alkyl radical Y is preferably C$_1$–C$_4$alkyl. The alkyl radicals mentioned above for Y can be unsubstituted or substituted by hydroxyl or C$_1$–C$_4$alkoxy, in particular by hydroxyl.

C$_2$–C$_4$alkanoyl Y is, for example, propionyl or, in particular, acetyl. The C$_2$–C$_4$alkanoyl radical Y can be further substituted by hydroxyl or, in particular, C$_1$–C$_4$alkoxy, for example ethoxy or, preferably, methoxy. Methoxyacetyl is the preferred substituted radical.

C$_1$–C$_4$alkoxycarbonyl Y is, for example, methoxy- or, in particular, ethoxycarbonyl. The C$_1$–C$_4$alkoxycarbonyl radical Y can be further substituted by hydroxyl or C$_1$–C$_4$alkoxy, for example methoxy or ethoxy. The corresponding unsubstituted radicals are preferred here.

C$_1$–C$_4$alkylsulfonyl Y is, for example, methyl- or ethyl-sulfonyl.

Phenylsulfonyl Y is, in addition to the corresponding unsubstituted radical, the radicals substituted by C$_1$–C$_4$alkyl, such as methyl, ethyl, propyl, isopropyl, butyl, sec-butyl, tert-butyl or isobutyl, C$_1$–C$_4$alkoxy, for example methoxy, ethoxy, propoxy, isopropoxy, butoxy or isobutoxy, or by halogen, for example fluorine, bromine or, in particular, chlorine. The unsubstituted radicals or, in particular, the radicals substituted by C$_1$–C$_4$alkyl, preferably by methyl, are preferred here.

C$_1$–C$_4$alkyl radicals contained in the radical X are, for example, methyl, ethyl, propyl, isopropyl, butyl, sec-butyl, tert-butyl or isobutyl, in particular methyl or ethyl and preferably methyl. C$_1$–C$_4$alkylene radicals contained in the radical X are, in particular, methylene or ethylene, and preferably methylene. X is preferably a radical of the formula —C$_1$–C$_2$alkylene-O—C$_1$–C$_2$alkyl, in particular a radical of the formula —CH$_2$—O—CH$_3$.

R$_1$, R$_2$ and R$_3$ are preferably independently of one another hydrogen or C$_1$–C$_4$alkyl, in particular hydrogen.

R$_4$ and R$_5$ are preferably independently of one another hydrogen or C$_1$–C$_4$alkyl, in particular hydrogen or methyl, and preferably hydrogen.

R$_6$ is preferably hydrogen.

Y is preferably hydrogen; unsubstituted or hydroxy- or C$_1$–C$_4$alkoxy-substituted C$_1$–C$_8$alkyl, C$_2$–C$_4$alkanoyl or C$_1$–C$_4$alkoxycarbonyl; or a radical of the formula —CH$_2$—CH=CH$_2$.

Y is particularly preferably unsubstituted or hydroxy- or C$_1$–C$_4$alkoxy-substituted C$_1$–C$_8$alkyl, C$_2$–C$_4$alkanoyl or C$_1$–C$_4$alkoxycarbonyl; or a radical of the formula —CH$_2$—CH=CH$_2$.

Y is especially preferably unsubstituted or hydroxy-substituted C$_1$–C$_8$alkyl, or a radical of the formula —CH$_2$—CH=CH$_2$. In particular, Y is C$_1$–C$_4$alkyl, preferably methyl.

Preferred azo dyes of the formula (1) are those in which R$_1$, R$_2$, R$_3$ and R$_6$ are hydrogen and R$_4$ and R$_5$ independently of one another are hydrogen or C$_1$–C$_4$alkyl, in particular hydrogen. X and Y here are as defined and preferred above.

Particularly preferred azo dyes of the formula (1) are those in which R$_1$, R$_2$, R$_3$, R$_4$, R$_5$ and R$_6$ are hydrogen and X is a radical of the formula —C$_1$–C$_2$alkylene-O—C$_1$–C$_2$alkyl, in particular a radical of the formula —CH$_2$—O—CH$_3$. Y here is as defined and preferred above.

Especially preferred azo dyes of the formula (1) are those in which R$_1$, R$_2$, R$_3$, R$_4$, R$_5$ and R$_6$ are hydrogen, X is a radical of the formula —CH$_2$—O—CH$_3$ and Y is C$_1$–C$_4$alkyl, in particular methyl.

The sulpho group in the azo dyes of the formula (1) is preferably bonded in the meta-position relative to the azo group.

The radical of the formula —O—Y in the azo dyes of the formula (1) is preferably bonded in the para-position relative to the azo group.

The present invention furthermore relates to a process for the preparation of azo dyes of the formula (1), which comprises diazotizing an amine of the formula

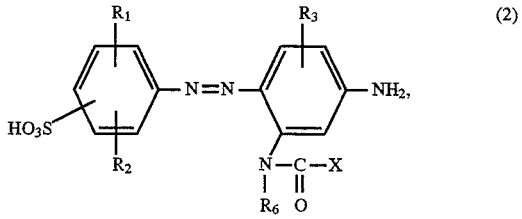

(2)

coupling the diazotization product to a coupling component of the formula

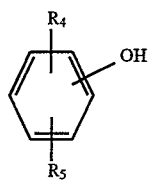

and, if desired, reacting the resulting reaction product with a compound which introduces the radical Y, in which $R_1$, $R_2$, $R_3$, $R_4$, $R_5$, $R_6$, X and Y are as defined under formula (1).

The diazotization of the compound of the formula (2) is carried out in a manner known per se, for example with a nitrite, for example with an alkali metal nitrite, such as sodium nitrite, in a mineral acid medium, for example in a hydrochloric acid medium, at temperatures from, for example, −5° to 40° C., and preferably at −5° to 10° C.

The coupling to the coupling component of the formula (3) is carried out in a manner known per se, at acidic, neutral or weakly alkaline pH, for example at a pH from 5 to 10, and at temperatures from, for example, −5° to 40° C., preferably 0° to 30° C.

Compounds of the formula $$\text{Hal-Y} \quad (4),$$

in which Hal is halogen, such as chlorine or bromine, in particular chlorine, can be used, for example, to introduce the radical Y. Examples of compounds of the formula (4) are acetyl chloride, propionyl chloride, methoxyacetyl chloride, ethyl chloroformate, isopropyl chloride, allyl chloride, p-toluenesulfonyl chloride, methylsulfonyl chloride and ethylsulfonyl chloride.

The introduction of the radical Y can be carried out, for example, in dipolar aprotic solvents, for example dimethylformamide or dimethyl sulfoxide, or in water or, preferably, in pyridine, at a temperature from, for example, 10° to 80° C., in particular 10° to 50° C.

If the introduction of the radical Y is an etherification, this can also be carried out with the corresponding dialkyl sulfate or alkylene oxide. This reaction is preferably carried out in an aqueous medium at a pH from, for example, 9 to 12 and at a temperature from, for example, 40° to 80° C. Examples of corresponding dialkyl sulfates are dimethyl sulfate and diethyl sulfate. Examples of corresponding alkylene oxides are n-butylene 1,2-oxide, propylene oxide and ethylene oxide.

Compounds of the formula (2) can be obtained, for example, by diazotizing an amine of the formula

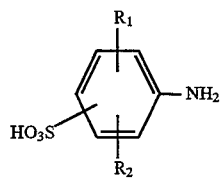

and coupling the diazotization product to a coupling component of the formula

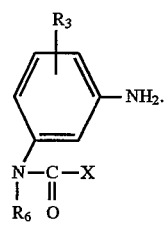

The diazotization of the amine of the formula (5) and the coupling to the compound of the formula (6) can be carried out by processes customary for these reactions, for example as defined above.

Coupling components of the formula (6) can be obtained, for example, by hydrogenation of compounds of the formula

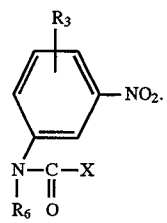

The hydrogenation can be carried out by processes customary for this reaction, for example in methanol in the presence of a palladium/charcoal catalyst.

In the process according to the invention for the preparation of the azo dyes of the formula (1), the substituents of the compounds used for the preparation are as defined and preferred above.

The compounds of the formulae (2), (3), (4), (5), (6) and (7) are known or can be prepared analogously to known compounds.

The azo dyes of the formula (1) are present either in the form of their free acid or, preferably, in the form of salts thereof.

The salts are, for example, the alkali metal or ammonium salts or the salts of an organic amine.

Examples are the sodium, lithium, potassium or ammonium salts or the salt of mono-, di- or triethanolamine.

The azo dyes of the formula (1) according to the invention are suitable, by methods known per se, for dyeing and printing, in particular of fibre materials containing nitrogen or containing hydroxyl groups, for example textile fibre materials of cellulose, silk and, in particular, wool and synthetic polyamides. Dyeing or printing of natural or synthetic polyamide fibre materials is preferred. The azo dyes of the formula (1) according to the invention can be used in the generally customary form, which may be prepared beforehand, for dyeing or printing. Level dyeings with good all-round properties, in particular good fastness to rubbing, wet processing, wet rubbing and light, are obtained. Furthermore, the dyes according to the invention are readily water-soluble and can easily be combined with other dyes. The abovementioned textile material can be in the most diverse processing forms, for example as fibre, yarn, woven fabric or knitted fabric.

In the following examples, parts denote parts by weight. The temperatures are degrees Celsius. Parts by weight bear the same relation to parts by volume as the gram to the cubic centimeter.

EXAMPLE 1

140 parts of 3-nitroaniline are dissolved in 590 parts of pyridine, and 132 parts of methoxyacetyl chloride are added dropwise at a temperature of 0° to 5° C. in the course of 60 minutes. The reaction mixture is allowed to react at a temperature of 5° C. for 2 hours and is then added to 4000 parts of water. The suspension is stirred for 20 minutes and filtered and the residue is washed with 2500 parts of water and 180 parts of alcohol. After drying, 199 parts of a compound of the formula

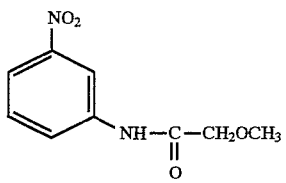
(101)

are obtained.

126.2 parts of the compound of the formula (101) are dissolved in 3000 parts of methanol and subjected to catalytic hydrogenation by means of a palladium/charcoal catalyst (10% by weight of palladium). After evaporation, 105 parts of the compound of the formula

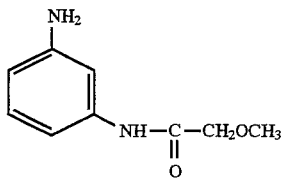
(102)

are obtained.

34.9 parts of 1-aminobenzene-3-sulfonic acid are stirred in 200 parts of water, and 21.2 parts of sodium carbonate are added. 54 parts of a 4 normal aqueous sodium nitrite solution are then added, and the reaction mixture is cooled to a temperature of 5° C. and added dropwise to 200 parts of ice and 64 parts of concentrated hydrochloric acid in the course of 35 minutes. The diazo solution thus obtained is stirred for 30 minutes and then added dropwise to a coupling solution which comprises 36.1 parts of the compound of the formula (102) in 200 parts of water and 240 parts of ice at a temperature of 0° to 5° C. in the course of 45 minutes. During the coupling, the pH is kept at a value of 6.5 by addition of 10% aqueous sodium carbonate solution. After the mixture has been stirred for 10 minutes, no further diazo component can be detected. 50.8 parts of a 4 normal aqueous sodium nitrite solution are added and the solution is added dropwise to 200 parts of ice and 56 parts of concentrated hydrochloric acid in the course of 55 minutes. The diazotization is allowed to reach completion at a temperature of 0° to 5° C. for 1 hour and the diazo suspension is then added to a solution of 19.8 parts of phenol in 400 parts of water and 19.6 parts of a concentrated aqueous sodium hydroxide solution at a temperature of 25° C. in the course of 30 minutes. A pH of 1.5 is established and, after the mixture has been stirred for 10 minutes, the pH is brought to a value of 9 with 30 parts of concentrated aqueous sodium hydroxide solution. 300 parts of sodium chloride are added to the brown suspension and the mixture is stirred overnight. The suspension is then filtered and the residue is washed with 25% aqueous sodium chloride solution and 10% aqueous sodium chloride solution. The moist residue is recrystallized directly from 700 parts of a mixture of ethylene glycol monomethyl ether and water in a ratio of 1:1. After drying, 62 parts of a dye which, in the form of the free acid, corresponds to the compound of the formula

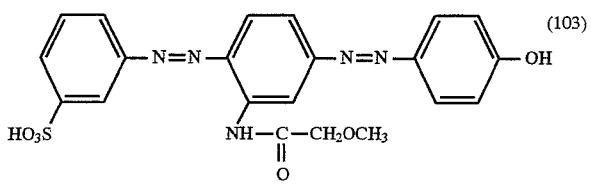
(103)

are obtained.

The dye of the formula (103) dyes wool and synthetic polyamide in yellow colour shades.

EXAMPLES 2 TO 8

Dyes which, in the form of the free acid, correspond to the compounds of the formulae

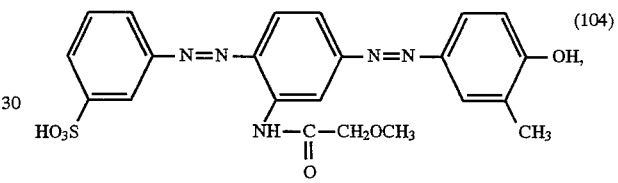
(104)

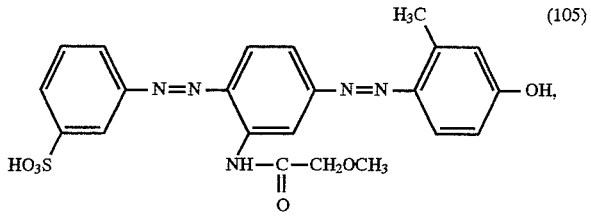
(105)

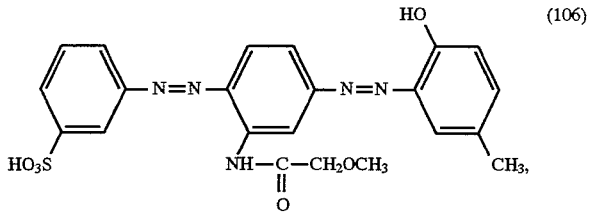
(106)

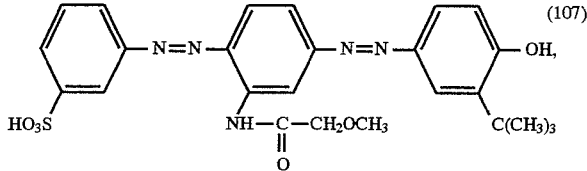
(107)

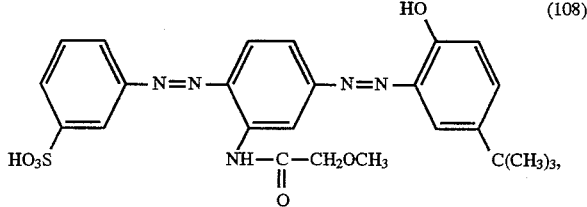
(108)

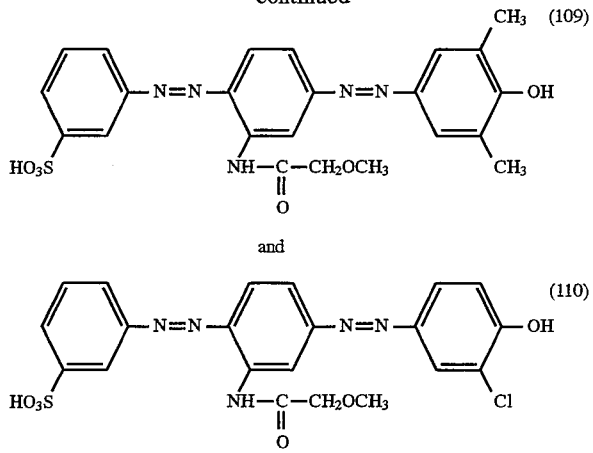

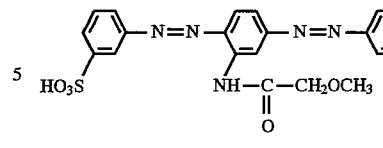

can be obtained in a manner analogous to that described in Example 1. The dyes of the formula (104) to (110) dye wool and synthetic polyamide in yellow colour shades.

EXAMPLE 9

9.4 parts of the compound of the formula (103) are stirred in 80 parts of pyridine, and 6.3 parts of acetyl chloride are added dropwise at room temperature in the course of 10 minutes. The reaction mixture is kept at a temperature of 30° C. for 3 hours and is then added to 300 parts of a 15% aqueous sodium chloride solution, and 100 parts of methanol are added. The suspension is stirred for 30 minutes and filtered and the residue is washed with water and methanol. After drying, 9.4 parts of a dye which, in the form of the free acid, corresponds to the compound of the formula (111)

are obtained. The dye of the formula (111) dyes wool and synthetic polyamide in yellow colour shades.

EXAMPLES 10 AND 11

The procedure described in Example 9 is repeated, but using an equimolar amount of methoxyacetyl chloride or methylsulfonyl chloride instead of 6.3 parts of acetyl chloride. The dyes, shown in the form of the free acid, of the formulae (112)

(113)

are obtained. The dyes of the formulae (112) and (113) dye wool and synthetic polyamide in yellow colour shades.

EXAMPLE 12

7 parts of the compound of the formula (103) are stirred in 150 parts of water, and 3.1 parts of triethylamine are added. 6 parts of p-toluenesulfonyl chloride are added to the resulting solution in the course of 2 minutes. After 20 minutes, the reaction mixture is diluted with 60 parts of water and stirred for 1 hour, 30 parts of an aqueous concentrated potassium chloride solution and 50 parts of methanol are added and the mixture is stirred for a further 20 minutes. It is then filtered and the moist residue is recrystallized directly from 30 parts of water and 80 parts of alcohol. After drying, 8.4 parts of a dye which, in the form of the free acid, corresponds to the compound of the formula

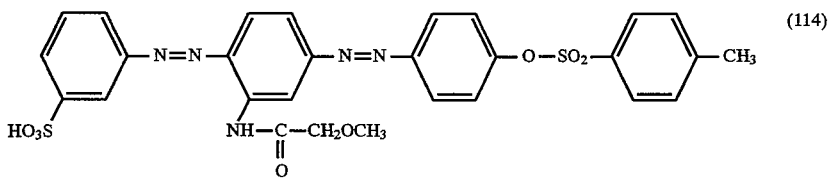

are obtained. The dye of the formula (114) dyes wool and synthetic polyamide in yellow colour shades.

EXAMPLES 13 TO 18

The procedure described in Example 12 is repeated, but using an equimolar amount of ethyl chloroformate, ethylsulfonyl chloride, dimethyl sulfate, diethyl sulfate, isopropyl chloride or allyl chloride instead of 6 parts of p-toluenesulfonyl chloride. The dyes, shown in the form of the free acid, of the formulae

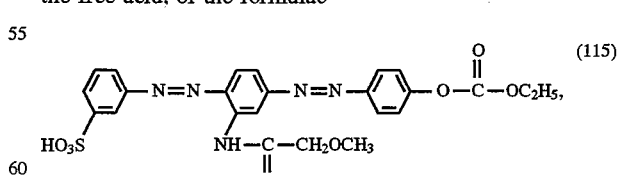

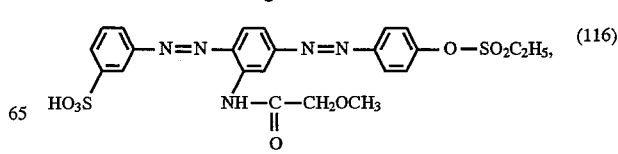

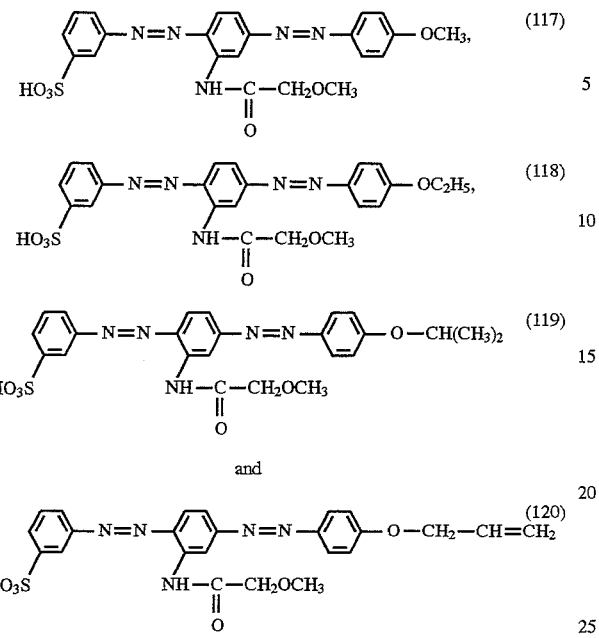

are obtained. The dyes of the formulae (115) to (120) dye wool and synthetic polyamide in yellow colour shades.

EXAMPLE 19

23.5 parts of the compound of the formula (103) are dissolved in 250 parts of water at a temperature of 60° C. and a pH of 11. 15 parts of n-butylene 1,2-oxide are added at this temperature and the reaction mixture is then allowed to react completely at a temperature of about 65° C. and a pH of 10.5 for 24 hours. Thereafter, the product is salted out with 15 parts of sodium chloride and filtered off. After drying, 22 parts of a dye which, in the form of the free acid, corresponds to the compound of the formula

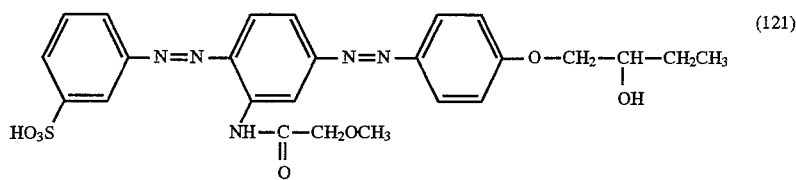

are obtained. The dye of the formula (121) dyes wool and synthetic polyamide in yellow colour shades.

EXAMPLES 20 AND 21

The procedure in Example 19 is repeated, but using an equimolar amount of propylene oxide or ethylene oxide instead of 15 parts of n-butylene 1,2-oxide. The dyes, shown in the form of the free acid, of the formulae

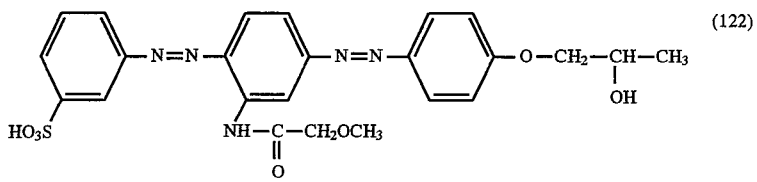

(122)

and

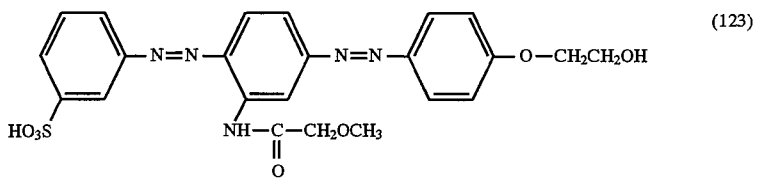

(123)

are obtained. The dyes of the formulae (122) and (123) dye wool and synthetic polyamide in yellow colour shades.

Dyeing example 1 part of a levelling assistant (based on the condensation product of a higher aliphatic amine and ethylene oxide) is added to 2000 parts of dimineralized water at room temperature. The bath is then brought to a pH of 6 with acetic acid. 0.4 part of the dye of the formula (117) is then added. 100 parts of polyamide 6.6 fibre material (helanca tricot) are introduced into the resulting dye solution and the dye bath is heated to a temperature of about 96° C. in the course of 45 minutes. The temperature is maintained for 45 to 60 minutes, the bath is then cooled to a temperature of 70° C. and the dyed goods are removed and rinsed with water and then dried. A fabric dyed in a yellow colour shade is obtained.

What is claimed is:

1. An azo dye of the formula

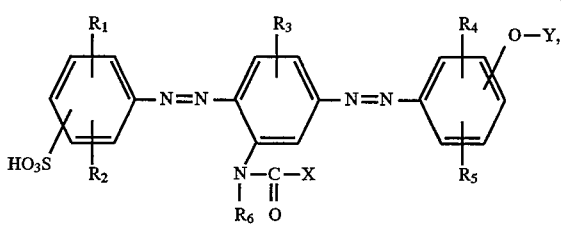

(1)

in which $R_1$, $R_2$, $R_3$, $R_4$ and $R_5$ independently of one another are hydrogen, $C_1-C_4$alkyl, $C_1-C_4$alkoxy or halogen, $R_6$ is hydrogen or $C_1-C_4$alkyl, X is —$C_1-C_4$alkylene-O—$C_1-C_4$alkyl and Y is hydrogen; unsubstituted or hydroxy- or $C_1-C_4$alkoxy-substituted $C_1-C_8$alkyl, $C_2-C_4$-alkanoyl or $C_1-C_4$alkoxycarbonyl; a radical of the formula —$CH_2$—CH=$CH_2$; $C_1-C_4$alkylsulfonyl; or unsubstituted or $C_1-C_4$alkyl-, $C_1-C_4$alkoxy- or halogen-substituted phenylsulfonyl.

2. An azo dye according to claim 1, in which $R_1$, $R_2$ and $R_3$ are hydrogen.

3. An azo dye according to claim 1, in which $R_4$ and $R_5$ independently of one another are hydrogen or $C_1-C_4$ alkyl.

4. An azo dye according to claim 1, in which $R_6$ is hydrogen.

5. An azo dye according to claim 1, in which

X is a radical of the formula —$C_1-C_2$alkylene-O—$C_1-C_2$alkyl.

6. An azo dye according to claim 1, in which

X is a radical of the formula —$CH_2$—O—$CH_3$.

7. An azo dye according to claim 1, in which

Y is unsubstituted or hydroxy- or $C_1-C_4$alkoxy-substituted $C_1-C_8$alkyl, $C_2-C_4$alkanoyl or $C_1-C_4$alkoxycarbonyl; or a radical of the formula —$CH_2$—CH=$CH_2$.

8. An azo dye according to claim 1, in which

Y is unsubstituted or hydroxy-substituted $C_1-C_8$ alkyl, or a radical of the formula —$CH_2$—CH=$CH_2$.

9. An azo dye according to claim 1, in which

Y is $C_1-C_4$alkyl.

10. An azo dye according to claim 1, in which $R_1$, $R_2$, $R_3$, $R_4$, $R_5$ and $R_6$ are hydrogen, X is a radical of the formula —$CH_2$—O—$CH_3$ and Y is $C_1-C_4$alkyl.

11. An azo dye according to claim 1, in which the sulfo group in the azo dyes of the formula (1) is bonded in the meta-position relative to the azo group.

12. A process for the preparation of an azo dye according to claim 1, which comprises diazotizing an amine of the formula

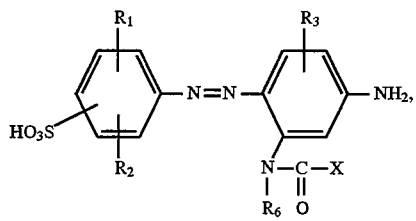

(2)

coupling the diazotization product to a coupling component of the formula

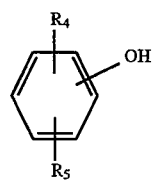

(3)

and, if desired, reacting the resulting reaction product with a compound which introduces the radical Y, in which $R_1$, $R_2$, $R_3$, $R_4$, $R_5$, $R_6$, X and Y are as defined in claim 1.

13. A process for dyeing or printing fibre material containing nitrogen or containing hydroxyl groups, which process comprises the step of applying to said fibre material a tinctorial amount of an azo dye according to claim 1.

14. A process according to claim 13 wherein said fibre material is natural or synthetic polyamide fibre material.

* * * * *